Jan. 29, 1929.  
J. H. HAMMOND, JR  
SHIP STABILIZER  
Filed Aug. 3, 1926

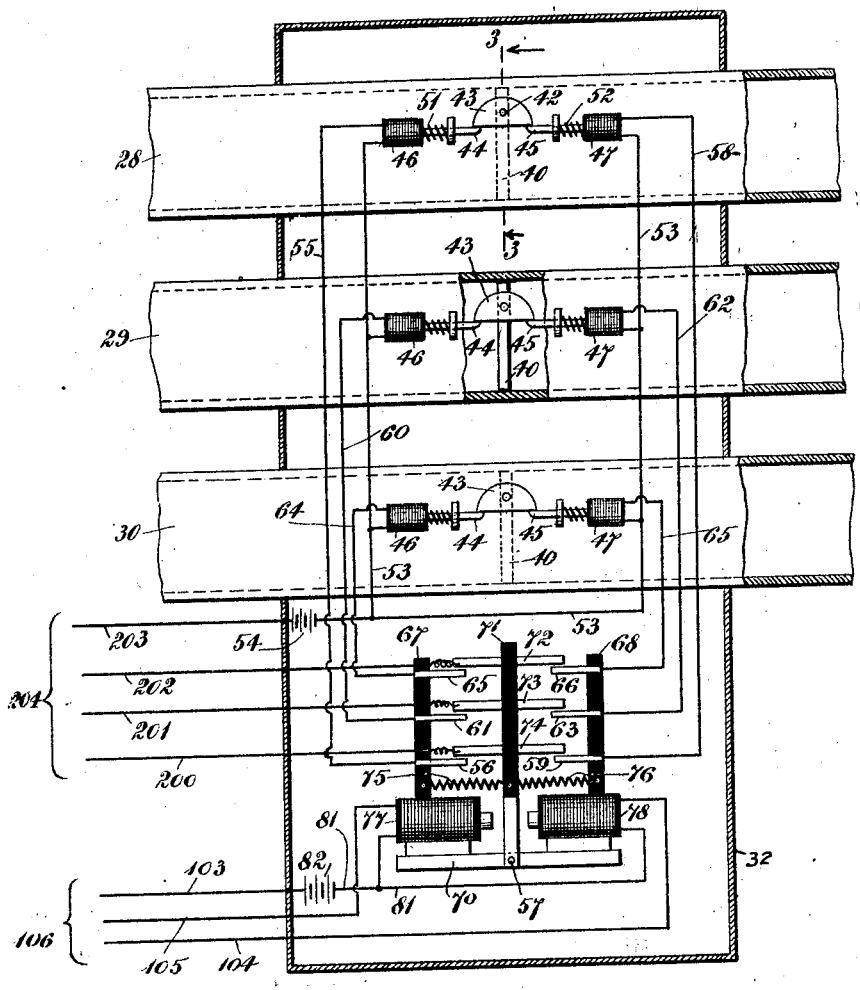

Jan. 29, 1929.
J. H. HAMMOND, JR
1,700,406
SHIP STABILIZER
Filed Aug. 3, 1926
7 Sheets-Sheet 3
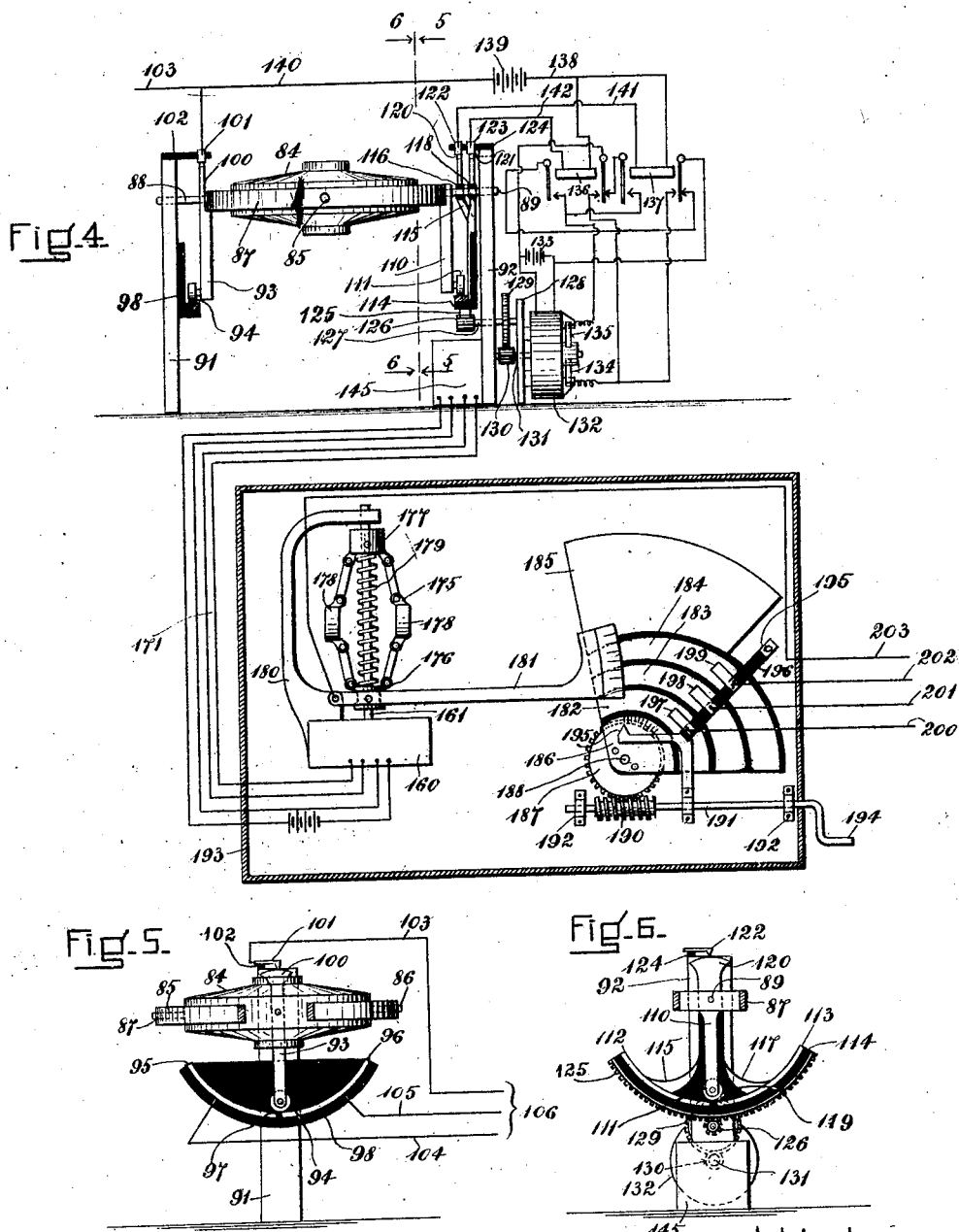
INVENTOR:
John Hays Hammond Jr
BY George A. E. Tindell
ATTORNEY:

Jan. 29, 1929.
J. H. HAMMOND, JR
1,700,406
SHIP STABILIZER
Filed Aug. 3, 1926   7 Sheets-Sheet 4
Fig-7-
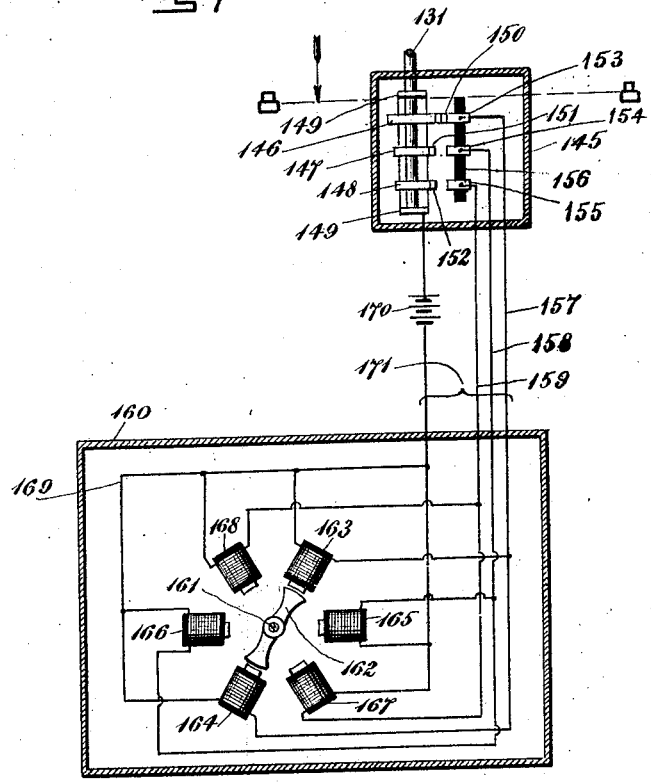
Fig.8.
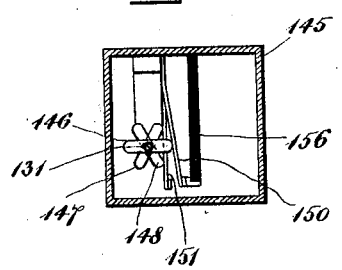
INVENTOR:
John Hays Hammond Jr
BY George A. E. Lundell
ATTORNEY:

Jan. 29, 1929.  
J. H. HAMMOND, JR  
1,700,406  
SHIP STABILIZER  
Filed Aug. 3, 1926  
7 Sheets-Sheet 5
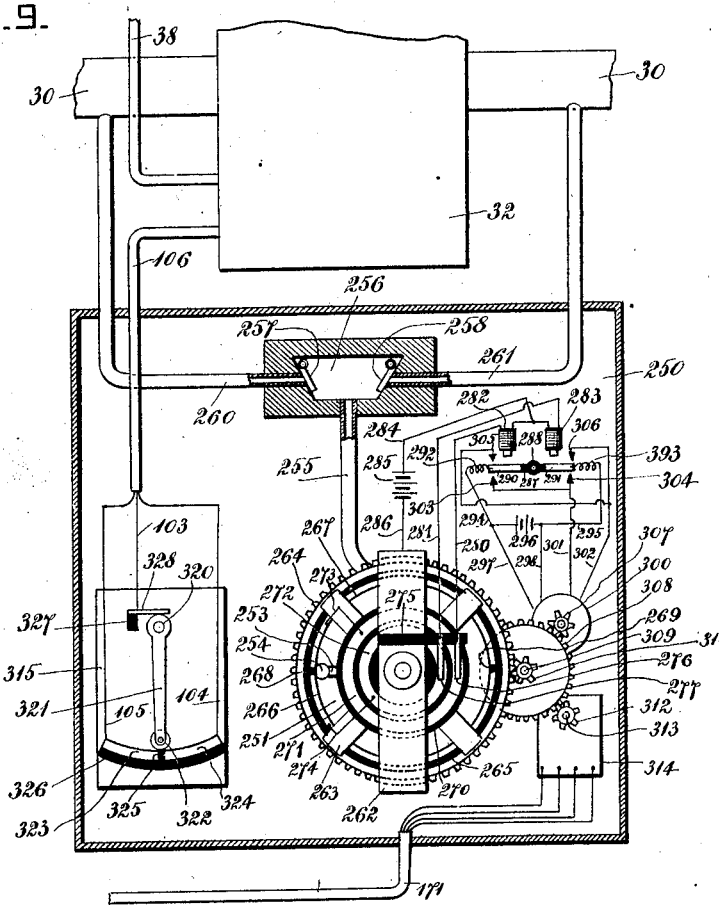
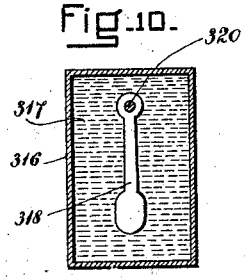
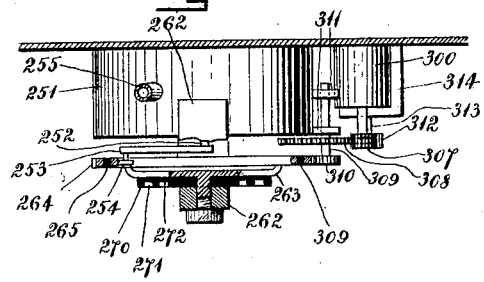

Jan. 29, 1929.

J. H. HAMMOND, JR 1,700,406

SHIP STABILIZER

Filed Aug. 3, 1926

INVENTOR:
John Hays Hammond Jr
BY George A. E. Tunnell
ATTORNEY=

Jan. 29, 1929.  J. H. HAMMOND, JR  1,700,406
SHIP STABILIZER
Filed Aug. 3, 1926   7 Sheets-Sheet 7

Patented Jan. 29, 1929.

1,700,406

UNITED STATES PATENT OFFICE.

JOHN HAYS HAMMOND, JR., OF GLOUCESTER, MASSACHUSETTS.

SHIP STABILIZER.

Application filed August 3, 1926. Serial No. 126,762.

This invention relates to the stabilization of ships.

A principal object of the invention is to provide against undesirable oscillation of a vessel afloat in a natural medium by the utilization of quantities of the medium for opposing by their weight the natural rolling movement of the vessel.

According to one feature of the invention the quantities of natural medium are retained in tanks positioned along the side of the ship for variable intervals depending upon the speed of oscillation of the vessel.

Another feature of the invention relates to the provision of control means interposed between transversely opposed tanks for controlling the effectiveness of the tanks. Another feature relates to the provision of a relatively small stabilizing device to actuate the control means whereby relatively large and heavy quantities of the natural medium may be readily controlled by a relatively small operating device of a small mass. Another feature relates to the provision of a momentum device variably operative in proportion to the speed of rolling movement of the ship whereby the number of interposed control devices to be rendered effective may be controlled.

Still another feature relates to the provision of manual means for modifying the effectiveness of the momentum device with respect to the operation of the control devices.

Other objects will appear from the following description taken in connection with the accompanying drawings in which, Figure 1 is a cross sectional view of a vessel embodying features of the invention;

Figure 2 is a diagrammatic view partly in section of the control devices;

Figure 3 is a detailed view partly in section of a portion of Figure 2 taken on line 3—3 of Figure 2;

Figure 4 is a diagrammatic view of the stabilizing and momentum devices;

Figure 5 is a section taken on the line 5—5 of Figure 4 and looking aft of the vessel;

Figure 6 is a sectional view taken on the line 6—6 of Figure 4 looking forward of the vessel;

Figure 7 is an enlarged diagrammatic view of the transmitter and repeater mechanism of Figure 4;

Figure 8 is a section of the transmitter taken on the line 8—8 of Figure 7;

Figure 9 is a diagrammatic view of a modified form of control system;

Figure 10 is a view showing the interior of part of the mechanism of Figure 9;

Figure 11 is a top plan view partly in section of a part of the control mechanism of Figure 9;

Like reference characters refer to like parts in the several figures of the drawings.

In the following description and claims, parts will be identified by specific names for convenience of expression, but they are intended to be as generic in their application to similar parts or equivalent construction as the art will permit.

Figure 1:
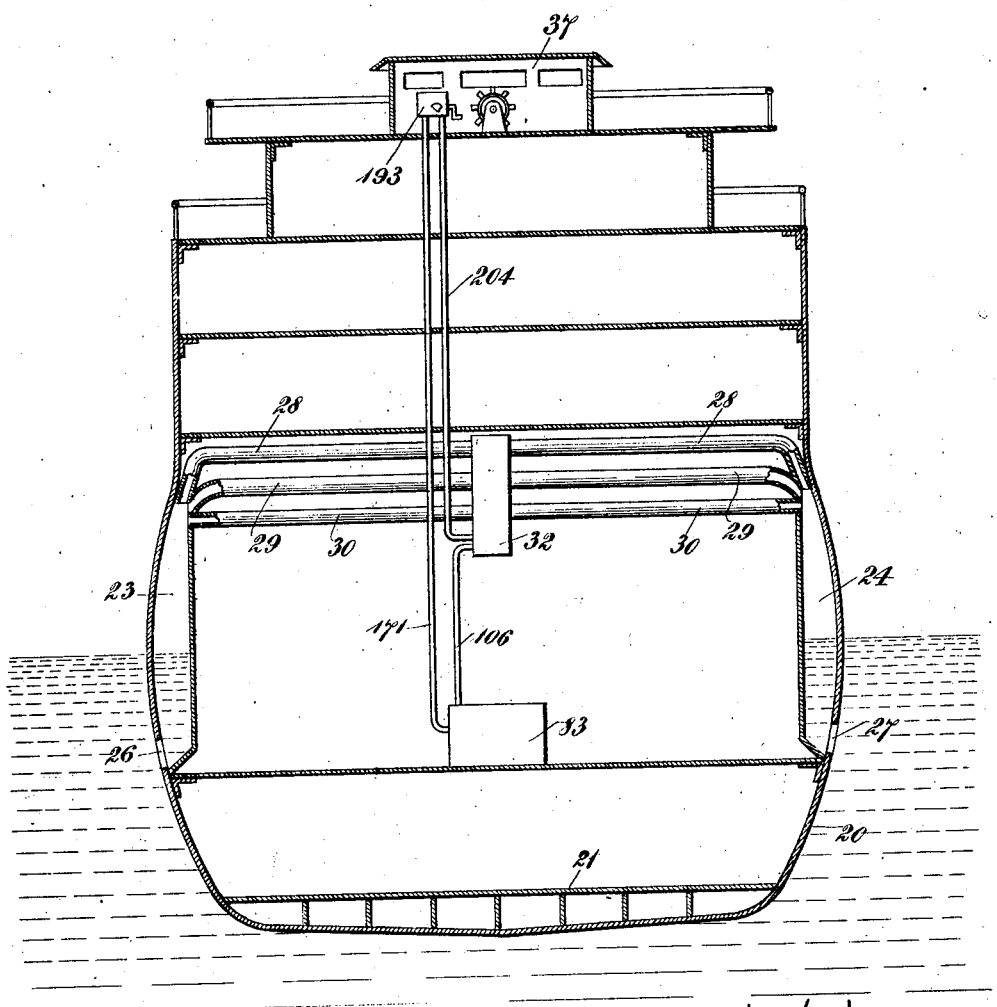
Figure 12:
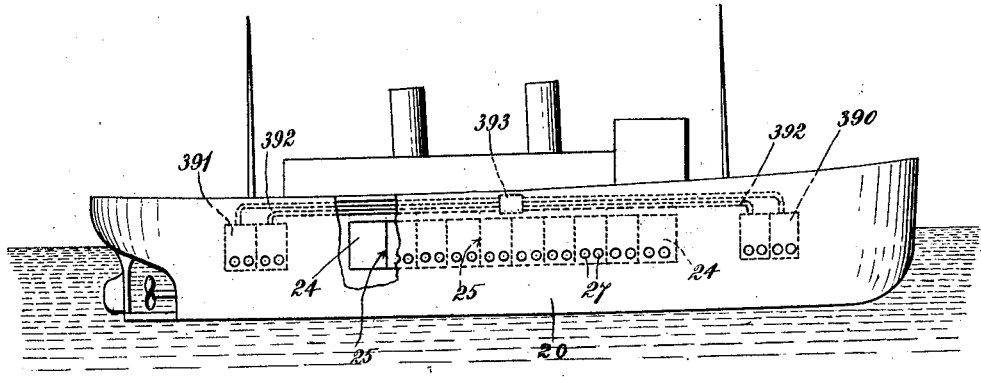
Figure 12 is a side elevation of a vessel provided with the tanks of Figure 1.

Referring to the drawings and more particularly to Figures 1 and 12, there is shown the hull of a ship 20 arranged to float in a natural medium such as the water of the sea and having a usual double bottom 21. Along each side of the vessel and in spaced relation to the hull of the ship there is provided a substantially vertical fluid tight partition forming in combination with the hull a longitudinal compartment such as 23, 24. Each of these compartments is further divided by vertical fluid tight partitions 25 (see Figure 12) to form on each side of the vessel a plurality of tanks, it being understood that the same number of tanks is provided on each side of the ship, and that oppositely positioned tanks are substantially equal in capacity. Each tank is provided at the lower portion thereof with perforations 26 and 27 opening outward to the sea for permitting the sea water in which the vessel floats, or other natural medium, to pass in and out of the tanks. The transversely opposed tanks are connected in pairs by a plurality of conducting pipes extending athwart the ship, the pipes, for one pair of such tanks being shown in detail in Figure 1 and designated respectively 28, 29 and 30. Though these are shown three in number, it is understood that any desired number of such connections may be provided between the tanks of each pair of oppositely disposed tanks. The pipes open into the upper interiors of the tanks.

For controlling the action of each pair of tanks there is interposed in the connecting pipes 28, 29 and 30 thereof a controller mechanism designated generally at 32 which will be now further described in detail.

The controller 32 comprises for each transverse conducting passage a valve 40 mounted in the respective conducting pipe, a description of one will suffice for all. Each valve is pivotally mounted upon pivots such as 41, 42, (see Figure 3). To one of the pivots 42 there is secured on the exterior of the respective conducting pipe a cam 43 formed semi-circularly in shape and controlled in its movement by means of two oppositely positioned detents 44 and 45. The detents 44 and 45 are controlled respectively by two solenoid magnets 46 and 47, there being provided in each case a retractile spring such as 51, 52 to maintain the respective detent in the position shown and thus to hold the respective valve 40 in its closed position.

For energizing the windings of the solenoids 46, 47 these solenoids are connected by a common conductor 53 to one pole of a source of energy such as a battery 54. One terminal of the winding of the solenoid 46 of the conducting pipe 28 is connected by a conductor 55 to a contact 56 of a relay device or selector 57. A terminal of the winding of the solenoid 47 of the conducting pipe 28 is connected by means of a conductor 58 to a relay contact 59. Similarly a terminal of the winding of the solenoid 46 of the conducting pipe 29 is connected by way of conductor 60 to a contact 61 of the relay device 57; and a terminal of the winding of the solenoid 47 of the conducting pipe 29 is connected by means of a conductor 62 to a contact 63 of the relay device 57. Also a terminal of the winding of the solenoid 46 of the conducting pipe 30 is connected by means of conductor 64 to a contact 65 of the relay device 57; and a terminal of the winding of the solenoid 47 of the conducting pipe 30 is connected by means of a conductor 65 to a contact 66 of the relay device 57. It will be seen that the contacts 56, 61, and 65 associated with the solenoids 46 are mounted upon a fixed block of insulating material 67 and that the terminal contacts 59, 63 and 66 connected to the solenoids 47 are mounted upon a second fixed block 68 of insulating material. The insulating blocks 67 and 68 form parts of the relay device 57 which includes also a base 70 having pivotally mounted thereon an arm 71, the upper end of which is formed of insulating material. There is secured to the arm 71 a plurality of conducting bars, shown three in number, and designated respectively 72, 73 and 74. The upper conducting bar 72 is so positioned as to be proximate to but normally disengaged from the contacts 65 and 66; the middle bar 73 normally disengaged from but in juxtaposition with the contacts 61 and 63; and similarly the lower contact bar 74 is positioned adjacent the contact terminal 56 and 59 but normally out of contact therewith. The arm 71 is normally held in intermediate position as shown, with the bars out of engagement with their respective contact terminals by means of two springs 75, 76 each secured at one of its ends to arm 71 and at its other end to the blocks 67 and 68 respectively. The lower part of the arm 71 is formed of a paramagnetic material such as iron and there is mounted upon the base 70 adjacent to this portion of the arm and on opposite sides thereof a pair of electromagnets 77, 78. One terminal of each of the magnets is connecteed to a common conductor 81 to one pole of a source of energy such as a battery 82. The arrangement is such that when the solenoid 77 is energized, as will subsequently be set forth, the arm 71 is attracted towards the left of Figure 2 and the bars 72, 73 and 74 engage respectively their left hand contacts 65, 61 and 56 for connecting into circuit the solenoids 46. If, however, the solenoid 78 be energized the bars 72, 73 and 74 engage respectively the right hand contacts 66, 63 and 59 extending to the associated solenoids 47. Deenergization of both solenoids 77 and 78 permits the restoration of the arm 71, under control of the springs 75 and 76, to the intermediate position with the circuits of the solenoids 46 and 47 open.

The valve solenoids 46, 47 are included in circuit with contacts of a momentum device and there is provided for the control of the momentum device a stabilizing element or gyroscope 83, which will now be described.

The gyroscope comprises a driving element positioned within a rotor casing 84, and driven in any suitable manner as by a source of electric current, (not shown) at relatively high speed so as to partake of the characteristics of a gyroscopic stabilizer. The casing 84 is mounted for rotation in space in a horizontal plane independent of the movement of the vessel, and is pivotally suspended upon a pair of oppositely disposed pivots 85, 86 secured in a usual gimbal ring 87. The gimbal ring 87 is in turn pivotally mounted upon a pair of pivots 88, 89 which are displaced 90 degrees with respect to the pivots 85 and 86 and are journalled in a pair of upstanding brackets 91, 92 secured to a portion of the structure of the vessel. It will be seen therefore that the brackets 91, 92 partake of the movement of the vessel upon which the structure is mounted, but that the casing 84 maintains, by virtue of its gyroscopic action, a substantially fixed horizontal position independent of the rolling or other movement of the vessel. An arm 93 formed of electrical conducting material is mounted upon the gimbal ring 87 and is provided at its lower free end with a roller 94 which rides upon either of a pair of aligned arcuate segments formed of conducting material and designated respectively 95, 96. The segments 95 and 96 are separated from one another by a relatively short strip of insulation 97 (see Figure 5) and are insulated from each other and from the frame of the device by a strip of insulating material 98 which is secured to one of the brackets 91. The arrangement is such that as the arm 93 moves with the respective gimbal ring 87, the roller 94 contacts with one or the other of the strips 95, 96, but so long as the gimbal ring 87 remains in fixed relation with the plane of the vessel the roller 94 engages only the insulating strip 97. The upper end of the oscillating arm 93 is provided with an enlarged head 100 having a rounded polished surface, and there is provided for constant engagement therewith a brush 101 which is mounted upon a block of insulating material 102 secured to the upper end of one of the brackets 91. A common conductor 103 extends from the brush 101 (see Figure 5) to the pole of the battery 82 (see Figure 2) opposite to that to which the conductor 81 is connected. One of the segments 95, shown to the left of Figure 5 is connected by way of a conductor 104 to the right hand electromagnet 78 (see Figure 2) of the relay device 57 and the other conducting segment 96 is connected by way of a conductor 105 to the left hand electromagnet 77 (see Figure 2) of the relay device 57. Thus as the arm 93 is tilted with respect to the vessel the arm 71 is attracted by the action of one of the magnets 78, 77 into one position or the other, thereby connecting into circuits either the electromagnets 46 or the electromagnets 47. For convenience the conductors 103, 104, 105 may be formed into an electric conduit or cable 106.

Similarly there is mounted upon the gimbal ring 87 diametrically opposite the arm 93 a second arm 110 electrically connected to the first arm through the gimbal ring. On the lower free end of the second arm 110 there is rotatably mounted a roller or cam 111 which engages selectively a pair of aligned arcuate segments 112, 113 formed of electrical conducting material and mounted upon a strip of insulating material 114. The strip 114 and the segments 112, 113 are movable independently of the vessel and of the arm 110 and for the purpose of maintaining normally electrical contact with the strip 112, there is provided a conducting arm 115 which is loosely mounted upon the gimbal ring pivot 89 and is insulated therefrom by an insulating bushing 116. Similarly the segment 113 is connected by way of conducting strip 117 which in turn is loosely mounted upon the gimbal ring pivot 89 by means of a second insulating bushing 118. The segments 112 and 113 are separated by a short strip of insulation 119. The upper ends of the conducting strips 115, 117 are provided with enlarged heads 120 and 121 having a rounded smooth upper surface with which there is in continuous engagement a pair of contacting brushes 122 and 123 respectively. The brushes 122 and 123 are supported upon an insulated bracket 124, mounted upon the upper end of the bracket frame 92.

For rotating the insulating segment 114 and the conducting strips 112, 113 there is secured to the convex surface of the insulating segment 114 a toothed gear segment 125 arranged to mesh with a pinion 126 carried on one end of a shaft 127. The shaft 127 is journalled into bracket 92 and in a motor bracket 128 and there is mounted thereon a speed reduction gear 129. In constant mesh with the gear 129 there is provided a driving pinion 130 which is mounted on a shaft 131 of a driving motor 132 mounted on the motor bracket 128. The motor bracket 128 is affixed to a portion of the frame of the vessel.

For energizing the motor 132, the field winding thereof is connected across the terminals of a battery 133 or other suitable source of energy.

The armature of the motor 132 is provided with a pair of brushes 134, 135 which are connected in relatively reversed relation to the front contacts of two relays 136, 137 the arrangement being such that when the left hand relay 136 is energized the battery 133 is connected to the brushes 134, 135 of the armature of the motor 132 and when the right hand relay 137 is energized the battery 133 is connected to the brushes 134 and 135 in the opposite direction. The polarity of the field energization being the same in both cases, it will be seen that when the left hand relay 136 is energized the motor 132 is driven in one direction and when the right hand relay 137 is energized the motor 132 is driven in the opposite direction. One terminal of the winding of each of the relays 136, 137 is connected by way of a common conductor 138 to one pole of a battery such as 139, the opposite pole of which is connected by branch conductor 140 to the brush 101 and thus to the gimbal ring 87, the arm 110 and roller 111. When the roller 111 is in contact with the segment 112 the circuit is closed to the contacting arm 115, contacting brush 122, a conductor 141, to a terminal of the winding of the right hand relay 137. Similarly when the roller 111 is in contact with the segment 113 a circuit is completed through the conducting strip 117, brush 123, a conductor 142 to a terminal of the winding of the left hand relay 136. Thus it will be seen that the arm 110 selectively connects into circuit the windings of the relays 136, 137 which in turn cause the actuation of the motor 132 in one direction or the other.

The shaft 131 of the motor 132 extends into a casing 145 and there is mounted on the shaft a plurality of cams, (see Figures 7 and 8) shown three in number and designated 146, 147, 148. The shaft 131 is journalled in a pair of spaced brackets such as 149, 149. Adjacent to the cams 146, 147, 148 there is provided a corresponding number of flexibly mounted contacts designated 150, 151, 152 and arranged to be engaged by the respective cams. When moved by the cams the contacts 150, 151 and 152 engage three stationary contacts 153, 154, 155. As seen in Figure 8 the cams 146, 147, 148 are arranged upon the shaft 131 so as to subtend angles of substantially 60 degrees with reference to each other and so that upon rotation of the shaft 131 a circuit is closed successively from the contact springs 150, 151, 152, to the stationary contacts 153, 154 and 155, a movement of 60 degrees being required of the shaft in order to close each successive contact. The contacts 153, 154, 155 are mounted on a bracket 156 formed of insulating material, and are connected for the remote control of a repeater mechanism to a corresponding plurality of conductors 157, 158 and 159 respectively.

The repeater mechanism is positioned within a casing 160 having a shaft 161 mounted therein for rotation. Secured to the shaft 161 is an armature 162 formed of paramagnetic material and arranged to be acted upon successively by a plurality of electromagnets in pairs, shown six in number, and to which the conductors 157, 158 and 159 are connected. The conductor 157 extends, for example, to one terminal of one of the electromganets 163 and to one terminal of the oppositely positioned electromagnet 164. Similarly the conductor 158 extends to one terminal of the winding of the electromagnet 165 and to a terminal of the oppositely positioned electromagnet 166. Similarly the conductor 159 extends to one terminal of the winding of an electromagnet 167 and to one terminal of the winding of the oppositely positioned electromagnet 168. Each of the other terminals of the windings of the electromagnets 163–168 inclusive is connected in turn to a common conductor 169 extending to one pole of a source of energy such as a battery 170, the opposite pole of which is connected to one of the brackets 149 and thus to the contact springs 150, 151 and 152. The conductors 169, 157, 158 and 159 may, for convenience, be formed into an electric conduit or cable 171 (see Figure 1). As the shaft 131 is rotated and the cams thereof move the contact springs into engagement with the corresponding contacts, the circuits including the conductors 157, 158, 159 are closed, and the electromagnets controlling the armature 162 are successively energized in pairs and cause the actuation of the armature 162. The shaft 161 thus repeats the movement of the shaft 131.

The shaft 161 of the repeater mechanism extends outwardly of the casing 160 and is provided with a speed indicating device which may take the form of a governor 175 having a grooved collar 176 loosely mounted on the shaft 161 arranged to slide longitudinally thereon. Secured to the shaft 161 as by being pinned thereto is a fixed collar 177. There is provided a momentum device in the form of a pair of governor weights or balls such as 178 linked to the slidable collar 176 and to the fixed collar 177. The weights 178 are normally maintained in the position shown by means of a spring 179 and are acted upon by centrifugal force resulting from rotation of the shaft 161, and they assume a position varying according to the speed of the shaft, thus serving effectively as a speed indicator. The outboard end of the shaft 161 is journalled in a bracket 180 secured to the casing 160 and there is pivotally mounted upon a lower portion of the bracket 180 a forked arm 181 which engages the groove of the slidable collar 176. The outer or free end of the arm 181 is formed to serve as an electrical contacting device engaging a plurality of contacting segments such as 182, 183, 184 and 185. These segments are mounted on but insulated from a movable base 186 which is affixed to a rotating gear 187 mounted on a rotatable shaft 188.

For rotating the gear 188 there is provided a worm 190 mounted on a rotatable shaft 191 which is journalled in spaced brackets 192, 192 and extends outwardly of a casing 193 and into the form of a handle 194 whereby the device may be manually adjusted into desired position. A pointer arm 195 is mounted in fixed position to register with graduations provided on the base member 186 to indicate the position of the device. The pointer arm serves as a support for a strip 196 of insulating material having mounted thereon a plurality of brushes 197, 198, 199, contacting respectively with the segments 182, 183, 184. The brush 197 is connected by a conductor 200 to the lower contacting bar 74 of the relay device 57. The intermediate brush 198 is connected by a conductor 201 to the intermediate contacting bar 73 of the relay device 57. The upper brush 199 is connected by a conductor 202 to the upper contacting bar 72 of the relay device 57. The arm 181 is connected by a conductor 203 to one pole of the battery 54 and serves as a common return conductor for the circuits of the solenoids 46, 47. The conductors 200, 201, 202 and 203 may, for convenience in installation, be formed into a conduit or cable 204 (see Figure 1).

The operation of the device may readily be understood from the foregoing description taken in connection with Figures 1 and 6 of the accompanying drawings. In the disclosure the vessel is shown in a central position and in a calm sea. The gyroscope in the casing 84 is set into motion, and because the vessel remains in fixed position with respect to its longitudinal axis, the fluid control device is not brought into operation. Should the sea become rough, however, and the vessel be rolled to the right for example, the vessel will be turned about its longitudinal axis, while the stabilizing element of the gyroscope remains fixed in space. The segment 113 (see Figure 6) will thus be caused to move into engagement with the contact roller 111 and a circuit closed from one pole of the battery 139 through conductor 140, brush 101, segment 100, gimbal ring 87, arm 110, roller 111, the segment 113, contact strip 117, segment 121, brush 123, conductor 142, the winding of relay 136, conductor 138 to the opposite pole of the battery 139, thus energizing the relay 136. The operation of the relay 136 closes a circuit from one pole of the battery 139, thus energizing the relay 136. The operation of the relay 136 closes a circuit from one pole of the battery 133, right hand armature and front contact of the relay 136, armature brush 134, armature of the motor 132, armature brush 135, left hand front contact and armature of the relay 136, right hand back contact and armature of the relay 137, opposite pole of the battery 133. It will be noted that the battery 133 also energizes the field magnet of the motor 132. The motor 132 is now energized and the armature thereof rotated to move the shaft 131 thereof in a counter clockwise direction as seen in Figure 6. The motion of the shaft 131 is communicated through the pinion 130 and gear 129 to cause a rotation of the contact segment 113 in a counter-clockwise direction until the roller 111 is moved on the strip of insulation 119 thus opening the circuit of the relay 136. The relay 136 is thereupon deenergized and its armatures retracted. The circuit of the armature of the motor 132 is thereby opened, and the motor is stopped.

If, however, the ship rolls in the opposite direction, that is to the left, the contact segment 112 is brought into electrical contact with the roller 111 and a circuit closed from one pole of the battery 139, conductor 140, brush 101, segment 100, gimbal ring 87, arm 110, roller 111, segment 112, conducting strip 115, segment 120, brush 122, conductor 141, winding of relay 137, conductor 138 to the opposite pole of the battery 139, thus energizing the winding of the relay 137. The relay 137 is operated and a circuit is then closed from one pole of the battery 133 through the right hand armature and back contact of the relay 136, left hand armature and front contact of the relay 137, armature brush 135, armature of the motor 132, armature brush 134, right hand front contact and armature of the relay 137 to the opposite pole of the battery 133, thus causing rotation of the armature of the motor 132 in the opposite direction until the segment 112 is rotated sufficiently to disengage from the roller 111. Thus it will be seen that the segment 112 and 113 together with the movable parts upon which they are mounted will constantly follow the movement of the arm 110 so that the speed of rotation of the motor 132 will be proportional to the angular speed of the arm 110 relative to the vessel. In this way the motor 132 will rotate at speeds proportional to the angular speed of roll or oscillation of the vessel about its longitudinal axis.

The rotation of the shaft 131 of the motor 132 causes the cams 146, 147, and 148 to close successively circuits extending to the repeater mechanism of the casing 160. For example, in one position of the shaft 131 a circuit is closed from one pole of the battery 170, bracket 149, contact spring 150, contact 153, conductor 157, electromagnets 163 and 164 in multiple, conductor 169 to the opposite pole of the battery 170. The armature 162 is thus attracted to a position in alignment with the cores of the electromagnets 163, 164. Now let it be assumed that the shaft 131 is moved 60 degrees in a direction to close the contact of the cam 147. The foregoing circuit is opened and a substitute circuit is closed from one pole of the battery 170, bracket 149, contact spring 151, contact 154, conductor 158, electromagnets 165 and 166 in multiple, conductor 169, to the opposite pole of the battery 170. The electromagnets 165 and 166 are now energized and cause the movement of the armature 162 in a clockwise direction through an angle of substantially 60 degrees so as to be in alignment with the cores of the energized electromagnets. Assuming that the shaft 131 is rotated still further the circuit which has just been described is broken by the cam 147 and the following circuit is closed; from one pole of the battery 170, bracket 149, contact spring 152, contact 155, conductor 159, electromagnets 167 and 168 in multiple, conductor 169 to the opposite pole of the battery 170. Still further the movement of the shaft 131 will cause this circuit to be broken and the first named circuit through the contacts 150, 153, conductor 157 and electromagnets 163 and 164 to be closed thus repeating the cycle of operation. A reversal of the movement of the shaft 131 causes a reversal of the movement of the shaft 161. In other words, the shaft 161 reproduces the movement of the shaft 131.

The momentum device comprising the weights 178 and the slidable collar 176 is actuated in proportion to the speed of the shaft 161, and thus upon the speed of the roll of the vessel at any given instant. Thus the arm 181 is raised (moved counter-clockwise as seen in Figure 4) an amount proportional to the speed of roll of the ship. A relatively high speed of roll will cause the arm 181 to be moved entirely away from the segment 182, 183, 184 and on to the electrically dead segment 185 thus opening the circuits of the conductors 200, 201 and 202 and preventing the actuation of the solenoid magnets 46, and 47 connected thereto.

When the boat is assumed to be rolling to the right, the roller 94 will be engaging the contact strip 95. This will cause the circuit to be closed from the battery 82 through conductor 103, brush 101, segment 100, arm 93, roller 94, segment 95, conductor 104, magnet 78 and conductor 81, to the other side of the battery 82, thus causing the magnet 78 to be energized, which rotates the arm 71 in a clockwise direction which will cause the cross-arms 72, 73 and 74 to engage the contacts 66, 63 and 59 respectively. As the angular speed of roll of the ship decreases, the rotation of the shaft 161 will decrease in a like manner, thus allowing the collar 176 to be gradually moved downward under the action of the spring 179. This will cause the contact fingers to engage successively the segments 184, 183 and 182 as the angular speed of roll of the ship decreases to zero.

As electrical contacts with the segments 184, 183 and 182 are successively closed, the conductor 203 will be successively connected to the conductors 202, 201 and 200, thence through the arms 72, 73 and 74, contacts 66, 63 and 59, conductors 65, 62 and 58, thus closing in successive order the circuits of the magnets 47 controlling the valves in the pipes 30, 29 and 28, and causing the energization of these magnets. As these magnets are energized, their cores are attracted against the action of the springs 52, thereby moving the detents 45 away from the cams 43 which are then together with the croresponding valve 40, allowed to rotate in a clockwise direction. Thus as the ship nears its position of maximum roll when the angular speed of roll decreases to zero, the valves 40 in the pipes 30, 29 and 28 will be successively opened. This will allow the air in the tank 24 which has been compressed due to the boat rolling to the right, (the water in this tank tending to enter through the holes 27) to pass successively through pipes 30, 29 and 28 into the tank 23 which is under a reduced pressure, as the water in this tank tends to escape through the holes 26. In this way, the pressure in the opposite tanks is gradually equalized as the boat approaches its position of maximum roll, thereby allowing the water to enter the tank 24 thru the holes 27, and rise to a level equal to that outside, while the water in tank 23 is allowed to escape through the holes 26 until it reaches a level equal to that of the water outside of this tank.

As the ship starts to roll in the other direction, that is to the left, the water will tend to drop in the tank 24, thereby producing a decrease of air pressure in this tank. This will cause the valves 40 to be rotated in a counter-clockwise direction until the cams 43 strike the detents 44. The valves will then be held in the closed position until the angular rotation of the ship about its longitudinal axis has increased sufficiently to raise the arm 181 so as to move the contact fingers off of the segments 182, 183 and 184 thus de-energizing the solenoids 47 and permitting the detents 45 to engage the cams 43, thereby locking the valves 40 in a closed position until the ship nears its maximum position of roll in the opposite direction, when an action similar to that just described will take place.

Thus a turning moment is produced which opposes the roll of the ship and is so timed that it gradually ceases to act as the ship nears its position of maximum roll. It will be noted that a maximum amount of water is lifted in the tanks, and is allowed to escape at the proper time so as to produce the maximum effect in damping the roll of the ship.

By rotating the handle 194, (Figure 4) the effectiveness of the segments 182, 183 and 184 may be changed with respect to the arc of travel of the contact fingers of the arm 181, as the segments 182, 183 and 184 are of a spiral shape their positions relative to the arm 181 will increase as they are rotated in a counter clockwise direction so that as the arm 181 moves downward, due to the slowing up of the roll of the boat, the contact fingers will meet the segments sooner than they would if they had been left in the position first described, thus allowing the valves 40 in the pipes 28, 29 and 30 to be open a longer interval of time before the ship reaches its position of maximum roll. By this means, the captain or quartermaster of the ship may change the relative time of opening of these valves to compensate for different weather conditions, so as to produce the maximum effect from the tanks.

In the modified form of the invention shown in Figures 9, 10 and 11, the same system of tanks 23 and 24 are used together with the pipes 28, 29 and 30, the valve control mechanism 32 and the adjusting mechanism 193 as in the form hereinbefore described. In this modified form, however, the gyroscopic control units 83 is replaced by a pressure control unit 250. This unit consists of a sensitive pressure gauge 251 including a shaft 252, having affixed thereto an arm 253. On the outer end of the arm 253 is rotatably secured a roller 254. The position of the shaft 252, arm 253 and roller 254 is dependent upon and determined by the pressure measured by the gauge 251 in a tube 255. The tube 255 is in communication with a chamber 256 which is provided with two check valves 257 and 258, which are located adjacent to the openings of two tubes 260 and 261. These tubes communicate with the pipe 30 on either side of the valve control mechanism 32.

Secured to the casing of the gauge 251 is a bracket 262, in which is rotatably mounted a spider 263. The outer face of this spider is provided with gear teeth 264. Secured to the inner face of the spider is a ring of insulating material 265, to which are fastened two semi-circular segments of conducting material 266 and 267. Between these segments are located two small pieces of insulating material 268 and 269. Mounted upon the spider 263 is a circular disc of insulating material 270, upon which are mounted two collector rings of conducting material 271 and 272. The collector ring 271 is connected by conductor 273 to the segment 267, and the collector ring 272 is connected by a conductor 274 to the segment 266. Mounted upon the bracket 262 is an arm of insulating material 275, upon which are mounted two brushes 276 and 277 which constantly engages the rings 271 and 272 respectively. These brushes are connected by two conductors 280 and 281 to the terminals of the windings of two magnets 282 and 283 respectively. The other terminals of the windings of these magnets are connected by a common conductor 284 to one pole of a battery 285, the other pole of which is connected by a conductor 286 to the bracket 262.

Rotatably mounted adjacent to the magnets 282 and 283, is an armature 287 which is pivoted about the point 288, and is provided with two segments of conducting material 290 and 291, which are insulated from each other. These segments are connected respectively to two centering springs 292 and 293 which cause the armature 287 to be held in a central position when neither of the magnets 282 and 283 are energized. The springs 292 and 293 are connected by conductors 294 and 295 to opposite poles of a battery 296. This battery is also connected by conductors 297 and 298 to the field windings of a motor 300. The two brushes of the motor 300 are connected by conductors 301 and 302 to contacts 303 and 304 and to 305 and 306 respectively. These contacts are located adjacent to the armature 287, so as to be engaged thereby when the armature is actuated.

The shaft of the motor 300 is provided with a pinion 307 which meshes with a gear 308 which is mounted upon a shaft 309 to which is secured a pinion 310 which meshes with the gear 264. The shaft 309 is rotatably mounted in bearings 311 secured to the gauge 251. The gear 308 also meshes with a pinion 312 which is mounted upon the shaft 313 of a transmitter mechanism 314, which is similar to the transmitter mechanism 145 shown in Figure 4. The terminals of this transmitter are connected to the four wire cable 171, and go to the repeater 160 located in the adjusting mechanism 193 shown in Figure 4.

The cable 106 from the valve control mechanism 32 leads to a stabilizing mechanism 315, which in this case, consists of a fluid tight casing 316 (see Figure 10) filled with a viscous fluid 317, such as oil. In this fluid is mounted a pendulum 318 which is keyed or otherwise secured to a shaft 320 extending outwardly of the casing 316. The shaft 320 has secured thereto outside of the casing 316 an arm 321 on the free end of which is rotatably mounted a roller 322 which engages successively two aligned segments of conducting material 323 and 324 separated by a strip of insulating material 325. These segments are mounted upon a piece of insulating material 326 which is secured to the casing 316. Also secured to this casing is a block of insulating material 327, upon which is mounted a brush 328 which engages the arm 321. The brush 328 and the segments 323 and 324 are connected to the conductors 103, 105 and 104 respectively of the cable 106.

In the operation of the form of invention shown in Figures 9, 10 and 11, as the ship rolls from one side to the other, to the right, for example, the water will tend to rise in the tank 24 and drop in the tank 23, thus causing an increase of pressure in the air in the tank 24. This increase of pressure in the tank 24 is transmitted through the pipe 30 and tube 261, opening the check valve 258 and thence through the pipe 255 to the pressure gauge 251. This will cause the arm 253 to be rotated in a clockwise direction at a speed dependent upon the rate of change of pressure in the tank 24. As the roller 254 moves on to the segment 267, a circuit will be closed from the battery 285, conductor 286, casing of the gauge 251, shaft 252, arm 253, roller 254, segment 267, conductor 273, ring 271, brush 276, conductor 280, magnet 282 and conductor 284, back to the other side of the battery 285, thus energizing the magnet 282 and rotating the armature 287, so that the segment 290 engages the contact 305 and the segment 291 engages the contact 304. This will allow current to flow from the battery 296 through the conductor 294, spring 292, segment 290, contact 305, conductor 302, to one brush of the motor 300, and from the other side of the battery 296 through the conductor 295, spring 293, segment 291, contact 304 and conductor 301 to the other brush of the motor 300, thus causing this motor to rotate in a clock-wise direction, which by means of the pinion 307, gear 308, and pinion 310, will rotate the gear 264 in a clockwise direction, thus causing the strip of insulation 268 to be moved under the roller 254.

This will break the circuit through the magnet 282, thus allowing the armature 287 to return to its neutral position, which will open the circuit to the brushes of the motor 300, thus casing this motor to stop. In this way, it is seen that the spider 263 will follow the motion of the arm 253, and that the shaft 313 of the transmitter 314 will be rotated by means of the pinion 312 at a speed proportional to the rate of motion of the arm 253, which as previously stated is proportional to the rate of change of pressure in the tank 24. It thus follows that the repeater 160 and therefore the governor 175 will be rotated at a corresponding speed which will cause the arm 181 to take up a position dependent upon the rate of pressure change in the tank 24. Thus as the ship nears its position of maximum roll, this pressure change will decrease in amount until at the position of maximum roll, it will have reached zero, at which time the arm 181 will be in its lowest position. It is thus seen that as the ship nears its position of maximum roll, solenoids 47 of the pipes 30, 29 and 28 will be energized successively, thus allowing the valves of these pipes to be opened successively as the ship nears its position of maximum roll, which as previously described will allow the air to pass from the tank 24 to the tank 23, causing the water levels of these tanks to become equal to that of the water outside. As the ship starts to roll in the opposite direction, the valves 40 will be closed in a manner similar to that previously described, thus producing a turning moment which will tend to decrease the roll of the ship.

Figure 13:
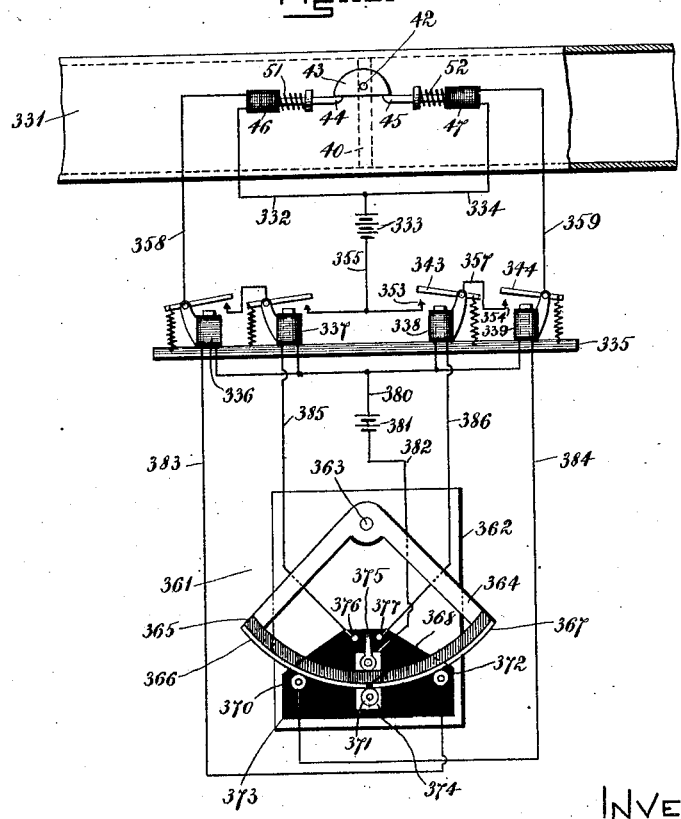
Figure 13 is a diagrammatic view of a modified form of stabilizing system.

In certain ships it may be found desirable to hold the water in the tank until the ship has passed its position of maximum roll and has started on the return movement. If it is found desirable to do this, a device such as that shown in Figure 13 may be employed. In this case it is only necessary to use a single transverse pipe 331, which would take the place of the three pipes 28, 29 and 30 as shown in Figure 1. A valve control mechanism is provided in connection with this pipe similar to that shown in Figure 2, and having like reference characters applied to like parts thereof. In this modified structure one terminal of the winding of the solenoid 46 is connected by a conductor 332 to one pole of a battery 333, and one terminal of the winding of the other solenoid 47 is connected to the same pole of the battery by a conductor 334. Mounted on a base of insulating material 335 are four relays 336, 337, 338 and 339 respectively. The contacts of the relays 336 and 337 are connected in series, and to a conductor 358 extending to the other terminal of the winding of the solenoid 46, the arrangement being such that the circuit of the winding of the solenoid 46 is closed and this solenoid is energized when both relays 336 and 337 are actuated. Similarly, the contacts of the remaining relays 338 and 339 are connected in series and to a conductor 359 extending to the other terminal of the winding of the solenoid 47, so that the circuit of the winding of the solenoid 47 is closed and this solenoid is energized when both relays 338 and 339 are actuated. A stabilizing mechanism 361, similar in construction to the stabilizing mechanism 315, is located in a position similar to that of the gyroscopic control unit 83, and includes a casing 362, containing a mass of viscous fluid, in which is mounted a pendulum, (not shown) similar to the pendulum 318. This pendulum is secured to a shaft 363 which carries a quadrant shaped member 364, to the ends of the arms of which are secured a segment of insulating material 365, upon which are mounted two segments of conducting material 366 and 367, separated by a strip of insulation 368. Engaging these segments are three rollers 370, 371 and 372. The rollers 370 and 372 are mounted upon a plate of insulating material 373 which is secured to the casing 362, while the roller 371 is mounted upon a plate of conducting material 374, which is secured to the plate 373. Rotatably mounted on the plate 374 is an elongated member 375 which presses against the segment 365. Two pins, 376 and 377 are mounted in the plate 373, normally spaced from but in position to be engaged by the member 375.

One terminal of the windings of the relays 336 to 339 is connected by a common conductor 380 to one pole of a battery 381, the other pole of which is connected by a conductor 382 to the plate 374. The other terminal of the winding of the relay 336 is connected by a conductor 383 to the roller 372; that of the relay 339 by conductor 384 to the roller 370; that of the relay 337 by a conductor 385 to the pin 376; and that of the relay 338 to the pin 377.

In the operation of this form of the invention, when the boat rolls to the right for example, the water will be lifted in the tank 23 and depressed in the tank 24 as previously described, thus causing a pressure in the tank 24 and a suction in the tank 23. This can not be equalized, however, as the valve 40 is held closed by means of the detents 44 and 45. As the ship rolls to the right, the segment 365 will be rotated in a counter clockwise direction with respect to the casing 362, thus causing the member 375 to be rotated in a counter clockwise direction, and engage the pin 376, thus energizing the relay 337. At the same time, the roller 371 will engage the segment 366, thus energizing the relay 339. As soon as the ship has reached its position of maximum roll and started its return motion, the segment 365 will start to move in a clockwise direction with respect to the casing 362, and the member 375 will be moved out of engagement with the pin 376, and into engagement with the pin 377, thus de-energizing the relay 337 and energizing the relay 338. As both relays 338 and 339 are now energized, the solenoid 47 will be energized, thus withdrawing the detent 345 from engagement with the cam 43, which will allow the valve 40 to rotate in a clockwise direction, thus allowing the air to escape from the tank 24 to the tank 23, which as previously described, will cause the water in these two tanks to assume the same level as the water outside.

It is thus seen that in this form of the invention, the water is held in the tank until the ship has reached its position of maximum roll and started on its return motion, so that the turning moment produced by this water is not suddenly diminished before the boat has reached its position of maximum roll as is the case with systems shown in Figures 1 to 6 and 9 to 11. For certain types of ships, it is thought that improved action will be effected thereby.

It may also be found desirable to apply this system to reducing the pitch of a ship due to wave action. In this case, tanks such as shown at 390 and 391 in Figure 12 may be located at the forward and aft ends of the ship on either side, and may be connected by longitudinal pipes 392 which pass through a control mechanism 393, which may be similar in construction and operation to any of the types of transverse control hereinbefore described.

Figure 14:
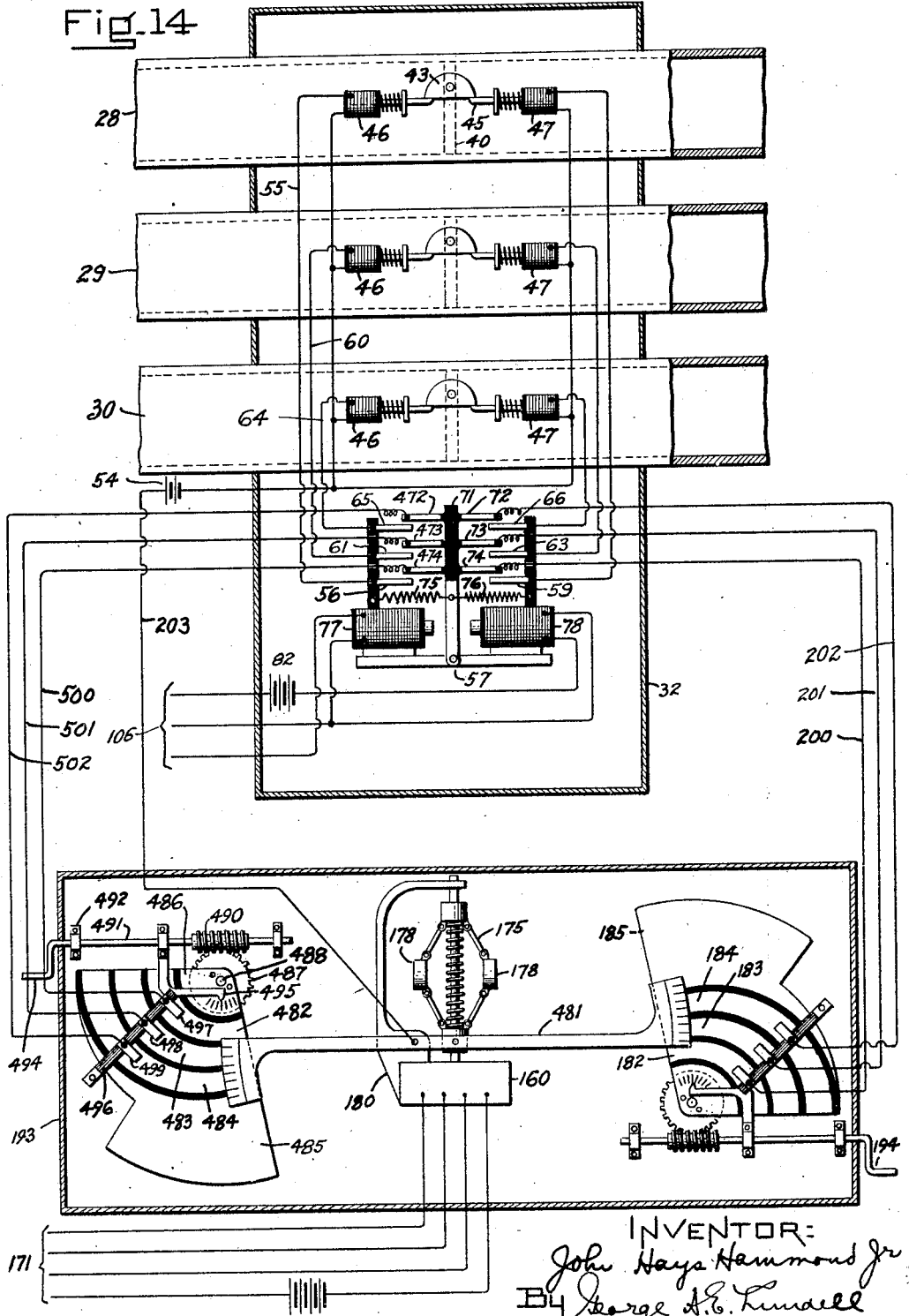
Figure 14 shows a modified form of the devices of Figures 2 and 4.

In the modified form of the invention shown in Figure 14 the passages 28, 29, 30 are provided with valve elements 40 as in Figure 2 for closing the passages to the flow of fluid. For unlatching the valve element 40 to permit the flow of fluid through the passages in one direction there is provided as in the case of the embodiment of Figure 2 a plurality of solenoids 46; and for unlatching the valves for the opposite direction of flow there is provided a plurality of solenoids 47. The solenoids 46 are connected by conductors 55, 60, 64 to stationary contacts 56, 61 and 65 respectively of the relay device 57; and, similarly the solenoids 47 are connected by conductors 58, 62, and 65 respectively to stationary contacts 59, 63, 66 of the relay device 57. The pivoted arm 71 carries two insulated sets of conducting bars, shown three in number in each set, one set 72, 73, 74 engaging in one off normal position of the arm 71 the stationary contacts 66, 63 and 59 respectively. The other set of conducting bars comprises conducting bars 472, 473 and 474 which engage in the other off-normal position of the arm 71 the contacts 65, 61, and 56 respectively. The arm 71 is normally held in intermediate normal position by the retractile springs 75, 76, so that the conducting bars 72, 73, 74 and 472, 473, 474 are normally disengaged from the stationary contacts.

The lower part of the arm 71 is formed of a paramagnetic material such as soft iron, and may be acted upon by a pair of opposed electromagnets 77, 78 which are connected in circuit with a source of energy 82 and a conducting cable 106 with the control device as shown in Figure 5. That portion of the control device shown in the upper part of Figure 4 is connected by way of cable 171 (see Figures 4 and 14) to a repeater mechanism 160 of the form shown in Figure 7. The repeater mechanism controls the speed indicating device, which as in Figure 4, is in the form of a governor 175 having a momentum device comprising a pair of governor weights or balls such as 178. The speed indicating device controls a double forked arm 481 pivotally mounted at an intermediate point in a bracket 180. Each of the ends of the arm 481 is formed to serve as an electrical contacting device engaging a plurality of contacting segments such as 182, 183, 184 and 185 for the end shown at the left hand portion of the figure. It will be seen that the segments 182—185 correspond with the like numbered segments in the embodiment shown in Figure 4, and that the construction and operation thereof is identical therewith.

Furthermore the construction and operation of the segments 482—485 are similar, there being provided therefor a movable base 486 which is affixed to a rotatable gear 487 mounted on a rotatable shaft 488. For rotating the gear 487 there is provided a worm 490 mounted upon a rotatable shaft 491 which is journalled in spaced brackets such as 492 and which extends outwardly of the casing 493 and into the form of a handle 494 whereby the segments 482—485 may be manually adjusted into desired position. A pointer 495 is provided for indicating the adjustment of the device and serves as a mounting for a strip 496 of insulating material having mounted thereon a plurality of brushes 497, 498, 499 which contact respectively with the segments 482, 483 and 484. The brush 497 is connected by a conductor 500 to the lower left hand contacting bar 474 of the relay device 57. The intermediate brush 498 is connected by a conductor 501 to the intermediate contacting bar 473 of the relay device 57. The upper brush 499 is connected by a conductor 502 to the upper left hand contacting bar 472 of the relay device 57.

It will thus be seen that in the embodiment of Figure 14 there is provided a device actuated by the speed of roll of the ship for each direction of movement of roll. Thus the adjustment made by the navigator of the ship may be made independently for the two directions of roll of the ship in accordance with the action of the ship in the sea. For example, if the ship is encountering winds in the quarter the navigator may adjust the handle 194 according to the roll of the ship to one side and he may adjust the handle 494 according to the roll of the ship to the other side. The navigator may thus accurately adjust the stabilizing system to counteract the effect of the elements.

The invention upon which this application is based is broader than the specific embodiment shown and described for the purpose of illustrating at least one of the ways in which it may be employed. The scope of the invention is therefore to be understood as not being limited by the present specific description. I intend no limitations other than those imposed by the claims.

What is claimed is:

1. In a system of ship stabilization, a vessel, a plurality of water tanks arranged in pairs along the sides of the vessel respectively, a plurality of connecting pipes interconnecting the tanks of each pair athwart the vessel, a control device interposed in each of said connecting pipes for controlling the movement of fluid therethrough, each control device including a valve element, a latch for locking said valve element, and an electromagnet for actuating said latch, and a stabilizing device for controlling the action of all of said magnets.

2. In a system of ship stabilization, a vessel, a plurality of fluid tight tanks arranged in pairs along the sides of the vessel respectively, a plurality of connecting pipes interconnecting the tanks of each pair athwart the vessel, a control device interposed in each of said connecting pipes for controlling the movement of fluid therethrough, locking means for normally maintaining said control device closed, electromagnetic means for actuating said locking means, and a gyroscope positioned substantially on the longitudinal axis of the ship for controlling said electromagnetic means.

3. In a system of ship stabilization, a vessel, a plurality of fluid tanks arranged in pairs along the sides of the vessel respectively, a plurality of connecting pipes interconnecting the tanks of each pair athwart the vessel, a valve interposed in each of said connecting pipes for controlling the movement of fluid therethrough, a latch for each valve, a solenoid arranged to actuate said latch, and a gyroscope stabilized with respect to a horizontal axis to control said solenoid.

4. In a stabilizing system for vessels adapted to float in a natural medium, containers for said medium positioned on opposite portions of the vessel, means for controlling the relative quantity of said medium in the various containers for counterbalancing the roll of the vessel, and a gyroscope stabilizer for operating said controlling means.

5. In a stabilizing system for vessels adapted to float in a natural medium, containers for said medium positioned on opposite portions of the vessel, means for controlling the relative quantity of said medium in the various containers for counterbalancing the roll of the vessel, and a gyroscopic stabilizer positioned between said containers for operating said controlling means.

6. In a stabilizing system for vessels adapted to float in a natural medium, containers for said medium positioned on opposite sides of the vessel, means for controlling the relative quantities of the fluid in the various containers for counter-balancing the roll of the vessel, and a gyroscopic stabilizer positioned substantially on the longitudinal axis of the vessel, for operating said controlling means.

7. In a ship control system, the combination with tanks arranged along the sides of the ship and open to the sea, of conducting pipes for fluid interconnecting oppositely disposed tanks, a valve for closing each of said pipes, electromagnetic means for controlling said valve, an element stabilized in space, an arm operatively connected to said element, and contact devices selectively engaged by said arm for controlling the circuit of said electromagnetic means.

8. In a ship control system, the combination with tanks arranged along the sides of the ship and open to the sea, of conducting pipes for fluid interconnecting oppositely disposed tanks, a valve for closing each of said pipes, electromagnetic means for controlling said valves, an element stabilized in space, an arm operatively connected to said element, contact devices selectively engaged by said arm for controlling the circuits of said electromagnet means, a second arm operatively connected to the stabilizing element, a motor controlled by said second arm, a momentum device controlled by said motor, and contact elements controlled by said momentum device for connecting into circuit additional ones of said electromagnetic means.

9. In a ship control system, the combination with tanks arranged along the sides of the ship and open to the sea, of conducting pipes for fluid interconnecting oppositely disposed tanks, a valve for closing each of said pipes, electromagnetic means for controlling said valves, an element stabilized in space, an arm operatively connected to said element, contact devices selectively engaged by said arm for controlling the circuits of said electromagnetic means, a second arm operatively connected to the stabilized element, contact devices selectively engaged by said second named arm, a motor controlled by said second arm and by said contact devices, a momentum device controlled by said motor, and contact elements controlled by said momentum device for connecting into circuit additional ones of said electromagnetic means.

10. In a system of navigation, a vessel having a hull, a pair of substantially vertical partitions extending along the sides of the vessel respectively and in spaced relation to the hull forming therewith two opposed longitudinal compartments, a plurality of transverse partitions in each of said longitudinal compartments to form fluid containers, each of said containers having apertures opening downward to the sea, a plurality of conducting pipes extending athwart the vessel and opening into the upper interiors of oppositely positioned tanks, a valve in each of said pipes, control mechanism for each valve comprising a semi-circular rotatable cam, a pair of oppositely positioned detents for controlling the movement of the cam in opposite directions of rotation, a retractile spring for each detent to maintain the respective detent in locking position and thus to maintain the valve in closed position, a solenoid for each detent for withdrawing the detent, a selector for connecting into circuit the solenoids controlling movement of the valves in one direction or the solenoids controlling movement of the valves in the other direction selectively, an arm for additively connecting into circuit said solenoids, a momentum device for actuating said arm, a repeating mechanism actuating said momentum device, a transmitting mechanism controlling said repeating mechanism, a motor for driving said transmitting mechanism, a pair of relays for controlling said motor, and a stabilizer for selectively actuating said relays and said selector.

11. In a system of navigation, a vessel having fluid containers along the sides of the vessel, each of said containers having apertures opening outward and downward to the sea, a plurality of conducting pipes extending athwart the vessel and opening into the upper interiors of oppositely positioned containers, a rotatable valve in each of said pipes, control mechanism for each valve having a latch for controlling the movement of the valves in opposite directions of rotation, a solenoid for each latch, a selector for connecting into circuit the solenoids controlling movement of the valves in one direction or the solenoids controlling movement of the valves in the other direction selectively, an arm for additively connecting into circuit said solenoids, a momentum device for actuating said arm, a repeating mechanism actuating said momentum device, a transmitting mechanism controlling said repeating mechanism, a motor for driving said transmitting mechanism, a pair of relays for controlling said motor, and a stabilizer for selectively actuating said relays and said selector.

12. In a system of navigation, a vessel having a hull, a pair of substantially vertical partitions extending along the sides of the vessel respectively and in spaced relation to the hull forming therewith two opposed longitudinal compartments, a plurality of transverse partitions in each of said longitudinal compartments to form fluid containers, each of said containers having apertures in the lower outer wall thereof, a plurality of conducting pipes extending athwart the vessel and opening into the upper interiors of oppositely positioned tanks, a valve in each of said pipes, control mechanism for each valve comprising a semi-circular rotatable cam, a pair of oppositely positioned detents for controlling the movement of the cam in opposite directions of rotation, a retractile spring for each detent to maintain the respective detent in locking position and thus to maintain the valve in closed position, a solenoid for each detent for withdrawing the detent, a switch arm for additively connecting into circuit said solenoids, a momentum device for actuating said arm, and means variably operative by the roll of the vessel to control said momentum device.

13. In a system of navigation, a vessel having a hull, a pair of substantially vertical partitions extending along the sides of the vessel and in spaced relation to the hull forming therewith two opposed longitudinal compartments, a plurality of transverse partitions in each of said longitudinal compartments to form fluid containers, each of said containers having apertures opening downward to the sea, a plurality of conducting pipes extending athwart the vessel and opening into the upper interiors of oppositely positioned tanks, a valve in each of said pipes, control mechanism for each valve comprising a semi-circular rotatable cam, a pair of oppositely positioned detents for controlling the movement of the cam in opposite directions of rotation, a retractile spring for each detent to maintain the respective detent in locking position and thus to maintain the valve in closed position, a solenoid for each detent for withdrawing the detent, a selector for connecting into circuit the solenoids controlling movement of the valves in one direction or the solenoids controlling movement of the valves in the other direction selectively, an arm and contacts engaged by said arm for additively connecting into circuit said solenoids, manual means for modifying the adjustment of said contacts with respect to said arm, a momentum device for actuating said arm, a repeating mechanism actuating said momentum device, a transmitting mechanism controlling said repeating mechanism, a motor for driving said transmitting mechanism, a pair of relays for controlling said motor, and a stabilizer for selectively actuating said relays and said selector.

14. In a system of ship stabilization, the combination with a floating body, containers for fluid thereon, and means to overcome the action of the elements upon said body comprising means stabilized with respect to a given axis and automatically operative to control the relative level of fluid in said tanks.

15. In a system of ship stabilization, the combination with a floating body, containers for fluid thereon, and means to overcome the action of the elements upon said body comprising a gyroscope automatically operative to control the relative level of fluid in said tanks.

16. In a system of ship stablization, the combination with a hull, of fluid tanks spaced apart thereon and having apertures arranged to dip into the sea, means interconnecting said tanks in pairs for conducting fluid, and means variably responsive to speeds of roll of the ship to control the flow of fluid through said interconnecting means.

17. A system for controlling a marine vessel, including in combination a ship's hull having fluid tanks spaced apart in pairs, a stabilizer including an element fixed in space, a controller for governing the amount of fluid in said tanks, and a momentum device actuated by relative movement of said stabilized element relative to the hull for operating said controller.

18. A system for controlling a marine vessel, including in combination a ship's hull having movable balancing means, a stabilizer including an element fixed in space, a controller for modifying the action of said movable balancing means, and a momentum device actuated by relative movement of said stabilized element relative to the hull for operating said controller.

19. A system for controlling a marine vessel, including in combination a buoyant body, means for controlling the balancing movement of said body to overcome the natural roll of the body, a normally inactive controller adapted to control said balancing means, a gyroscope positioned on said body, a momentum device variably operative according to the speed of roll of the body, and means operated by the conjoint action of said gyroscope and said momentum device for controlling the relative periods at which said controller becomes effective, and means actuated by relative movement of the gyroscope with respect to the body for rendering said controller active.

20. A system for controlling a marine vessel, including in combination a buoyant body, means thereon for varying a mass of material for balancing the body, locking means for causing said first mentioned means to retain the balancing material, an arm for controlling the action of the last named means, a rotatable shaft, a momentum element slidably mounted on the shaft and acted upon by centrifugal force to restore the momentum element to normal, means for controlling said arm by said momentum element, a gyroscopic rotor stabilized in space with respect to a given axis, power means actuated by and in proportion to movement of the buoyant body with respect to the gyroscopic rotor for driving said shaft, and means controlled by said arm for actuating the locking means.

21. In a system for controlling marine vessels, a buoyant body, a speed indicating device, means controlled by rolling movement of the body for actuating said device to indicate the speed of roll of the body, and means controlled by said speed indicating device for balancing the body with respect to a given fixed plane.

22. In a system for controlling marine vessels, a buoyant body, a speed indicating device, means controlled by rolling movement of the body for actuating said device to indicate the speed of roll of the body, a gyroscope stabilized with respect to a fixed plane, and means controlled by the conjoint action of said gyroscope and said speed indicating device for balancing the body with respect to said plane.

23. A system for controlling a buoyant body, including in combination fluid containers positioned on said body at spaced points to control balancing fluid, a plurality of conducting pipes interconnecting said containers, valves controlling said pipes respectively, a speed indicating device actuated proportionally to the speed to lateral roll of the body, a stabilizing device stabilized with respect to a given fixed plane, and means controlled by the conjoint action of the speed indicating device and the stabilizing device to actuate said valves at relatively different time.

24. The combination with a movable body, of fluid means to balance said body with respect to a horizontal plane, a gyroscope, and means controlled by the gyroscope to control the action of said balancing means.

25. The combination with a buoyant body, of means thereon for containing a mass of movable material, means for conducting said material about said body, a gyroscope having an element stabilized with respect to a fixed predetermined plane, a momentum device variably acted upon by relative movement of the buoyant body with respect to said gyroscope element, and means controlled by the conjoint action of said gyroscope and said momentum device for controlling said conducting means.

26. In a system of ship stabilization, a vessel, a plurality of water tanks arranged in pairs along the sides of the vessel respectively, a plurality of connecting pipes interconnecting the tanks of each pair athwart the vessel, a control device interposed in each of said connecting pipes for controlling the movement of fluid therethrough, each control device including a valve element, a latch for locking said valve element, and an electro magnet for actuating said latch, a stabilizing device, and a circuit closing device controlled by said stabilizing device for controlling said latch magnets.

27. In a system of ship stabilization, a vessel, a plurality of water tanks arranged in pairs along the sides of the vessel respectively, a plurality of connecting pipes interconnecting the tanks of each pair athwart the vessel, a control device interposed in each of said connecting pipes for controlling the movement of fluid therethrough, each control device including a valve element, a latch for locking said valve element, and an electro magnet for actuating said latch, a stabilizing device, a circuit closing device controlled by said stabilizing device for controlling said latch magnets, and manual means for varying the effectiveness of said circuit controlling device.

28. In a system of ship stabilization, a vessel, a plurality of fluid tight tanks arranged in pairs along the sides of the vessel respectively, a plurality of connecting pipes interconnecting the tanks of each pair athwart the vessel, a control device interposed in each of said connecting pipes for controlling the movement of fluid therethrough, locking means for normally maintaining said control device closed, electromagnetic means for actuating said locking means, a gyroscope positioned substantially on the longitudinal axis of the ship for closing the circuit of said electro magnetic means at a predetermined point in the roll of the vessel, and means for modifying the effectiveness of said gyroscope.

29. In a system of ship stabilization, a vessel, a plurality of fluid tanks arranged in pairs along the sides of the vessel respectively, a plurality of connecting pipes interconnecting the tanks of each pair athwart the vessel, a valve interposed in each of said connecting pipes for controlling the movement of fluid therethrough, a latch for each valve, a solenoid arranged to actuate said latch, a gyroscope stabilized with respect to a horizontal axis for closing the energizing circuit of said solenoid, and a manually adjustable device for changing the effectiveness of said gyroscope.

30. In a stabilizing system for vessels adapted to float in a natural medium, containers for said medium positioned on opposite portions of the vessel, normally ineffective means for transmitting medium from one container to a different container for counter-balancing the roll of the vessel, and a gyroscope stabilizer for rendering said transmitting means effective at a predetermined point in the roll of the vessel.

31. In a stabilizing system for vessels adapted to float in a natural medium, containers for said medium positioned on opposite portions of the vessel, normally ineffective means for transmitting medium from one container to a different container for counter-balancing the roll of the vessel, a gyroscope stabilizer for rendering said transmitting means effective at a predetermined point in the roll of the vessel, and a manually adjustable device for modifying the effectiveness of the gyroscope with respect to the transmitting means.

32. In a stabilizing system for vessels adapted to float in a natural medium, containers for said medium positioned on opposite portions of the vessel, means for controlling the relative quantity of said medium in the various containers for counter-balancing the roll of the vessel, a gyroscopic stabilizer positioned between said containers, means operatively interconnecting the gyroscope and said controlling means, and manual means for modifying the action of said interconnecting means.

33. In a stabilizing system for vessels adapted to float in a natural medium, containers for said medium positioned on opposite sides of the vessel, means for controlling the relative quantities of said medium in the various containers for opposing the roll of the vessel, a gyroscopic stabilizer positioned substantially on the longitudinal axis of the vessel, for operating said controlling means, and manual means for modifying the effectiveness of the stabilizer with respect to the controlling means.

34. In a ship control system, the combination with a ship having tanks arranged along the sides thereof and open to the sea, of conducting pipes for fluid interconnecting oppositely disposed tanks, a valve for closing each of said pipes, electromagnetic means for controlling said valves, an element stabilized with respect to the horizontal, an arm pivotally mounted on the ship, a yielding element for normally maintaining said arm in predetermined position, power transmitting means interconnecting said element and said arm for rotating the arm to an extent proportional to the speed of roll of the ship with respect to the horizontal, adjustable contact devices selectively engaged by the arm for controlling the circuits of said electromagnetic means, and manually adjustable means for changing the adjustment of said devices at the will of an operator.

35. In a ship control system, the combination with a ship having tanks arranged along the sides thereof and open to the sea, of conducting pipes for fluid interconnecting oppositely disposed tanks, a valve for closing each of said pipes, electromagnetic means for controlling said valves, an element stabilized with respect to the horizontal, an arm pivotally mounted on the ship, a yielding element for normally maintaining said arm in predetermined position, power transmitting means interconnecting said element and said arm for rotating the arm to an extent proportional to the speed of roll of the ship with respect to the horizontal, adjustable contact devices selectively engaged by the arm for controlling the circuits of said electromagnetic means, manually adjustable means for changing the adjustment of said devices at the will of an operator, and an indicator for indicating the adjustment of said devices.

36. In a ship control system, the combination with tanks arranged along the sides of the ship and open to the sea, of conducting pipes for fluid interconnecting oppositely disposed tanks, a valve for closing each of said pipes, electromagnetic means for controlling said valves, an element stabilized in space, an arm operatively connected to said element, contact devices selectively engaged by said arm for controlling the circuits of said electromagnetic means, a second arm operatively connected to the stabilized element, a motor controlled by said second arm, a momentum device controlled by said motor, contact elements controlled by said momentum device for connecting into circuit additional ones of said electromagnetic means, and means for changing the relation between said device and said contact elements.

37. In a ship control system, the combination with tanks arranged along the sides of the ship and open to the sea, of conducting pipes for fluid interconnecting oppositely disposed tanks, a valve for closing each of said pipes, electromagnetic means for controlling said valves, an element stabilized in space, an arm operatively connected to said element, contact devices selectively engaged by said arm for controlling the circuits of said electromagnetic means, a second arm operatively connected to the stabilized element, contact devices selectively engaged by said second named arm, a motor controlled by said second arm and by said contact devices, a momentum device controlled by said motor, contact elements controlled by said momentum device for connecting into circuit additional ones of said electromagnetic means, and means for modifying at the will of an operator the relation between the momentum device and said contact elements.

38. In a system of navigation, a vessel having a hull, a pair of substantially vertical partitions extending along the sides of the vessel respectively and in spaced relation to the hull forming therewith two opposed longitudinal compartments, a plurality of transverse partitions in each of said longitudinal compartments to form fluid containers, each of said containers having apertures opening downward to the sea, a plurality of conducting pipes extending athwart the vessel and opening into the upper interiors of oppositely positioned tanks, a valve in each of said pipes, control mechanism for each valve comprising a semi-circular rotatable cam, a pair of oppositely positioned detents for controlling the movement of the cam in opposite directions of rotation, a retractile spring for each detent to maintain the respective detent in locking position and thus to maintain the valve in closed position, a solenoid for each detent for withdrawing the detent, a selector for connecting into circuit the solenoids controlling movement of the valves in one direction or the solenoids controlling movement of the valves in the other direction selectively, an arm for additively connecting into circuit said solenoids, a momentum device for actuating said arm, a repeating mechanism actuating said momentum device, a transmitting mechanism controlling said repeating mechanism, a motor for driving said transmitting mechanism, a pair of relays for controlling said motor, a stabilizer for selectively actuating said relays and said selector, and means for modifying at will the relation between the stabilizer and the relays and selector.

39. In a system of navigation, a vessel having fluid containers along the sides of the vessel, each of said containers having apertures opening outward and downward to the sea, a plurality of conducting pipes extending athwart the vessel and opening into the upper interiors of oppositely positioned containers, a rotatable valve in each of said pipes, control mechanism for each valve having a latch for controlling the movement of the valves in opposite directions of rotation, a solenoid for each latch, a selector for connecting into circuit the solenoids controlling movement of the valves in one direction or the solenoids controlling movement of the valves in the other direction selectively, an arm for additively connecting into circuit said solenoids, a momentum device for actuating said arm, a repeating mechanism actuating said momentum device, a transmitting mechanism controlling said repeating mechanism, a motor for driving said transmitting mechanism, a pair of relays for controlling said motor, a stabilizer for selectively actuating said relays and said selector, and means for modifying at will the relation between the stabilizer and the relays and selector.

40. In a system of navigation, a vessel having a hull, a pair of substantially vertical partitions extending along the sides of the vessel respectively and in spaced relation to the hull forming therewith two opposed longitudinal compartments, a plurality of transverse partitions in each of said longitudinal compartments to form fluid containers, each of said containers having apertures in the lower outer wall thereof, a plurality of conducting pipes extending athwart the vessel and opening into the upper interiors of oppositely positioned tanks, a valve in each of said pipes, control mechanism for each valve comprising a semi-circular rotatable cam, a pair of oppositely positioned detents for controlling the movement of the cam in opposite directions of rotation, a retractile spring for each detent to maintain the respective detent in locking position and thus to maintain the valve in closed position, a solenoid for each detent for withdrawing the detent, a switch arm for additively connecting into circuit said solenoids, a momentum device for actuating said arms, means variably operative as a result of the roll of the vessel to control said momentum device, and manual means for changing the effectiveness of said last named means.

41. In a system of navigation, a vessel having a hull, a pair of substantially vertical partitions extending along the sides of the vessel and in spaced relation to the hull forming therewith two opposed longitudinal compartments, a plurality of transverse partitions in each of said longitudinal compartments to form fluid containers, each of said containers having apertures opening downward to the sea, a plurality of conducting pipes extending athwart the vessel and opening into the upper interiors of oppositely positioned tanks, a valve in each of said pipes, control mechanism for each valve comprising a semi-circular rotatable cam, a pair of oppositely positioned detents for controlling the movement of the cam in opposite directions of rotation, a retractile spring for each detent to maintain the respective detent in locking position and thus to maintain the valve in closed position, a solenoid for each detent for withdrawing the detent, a selector for connecting into circuit the solenoids controlling movement of the valves in one direction or the solenoids controlling movement of the valves in the other direction selectively, an arm and contacts engaged by said arm for additively connecting into circuit said solenoids, a spring for restoring said arm, manual means for modifying the adjustment of said contacts with respect to said arm, an indicator to indicate the position of said manual means, a momentum device for actuating said arm, a repeating mechanism actuating said momentum device, a transmitting mechanism controlling said repeating mechanism, a motor for driving said transmitting mechanism, a pair of relays for controlling said motor, and a stabilizer for selectively actuating said relays and said selector.

42. In a system of ship stabilization, the combination with a hull, of tanks spaced apart thereon and having apertures arranged to dip into the sea, means interconnecting said tanks in pairs for conducting a fluid, means variably responsive to speeds of roll of the ship to control the flow of said fluid through said interconnecting means, and manual means for changing the effectiveness of the speed responsive means relative to the interconnecting means.

43. A system for controlling a marine vessel, including in combination a ship's hull having fluid tanks spaced apart in pairs, a stabilizer including an element fixed in space, a controller for varying the contents of said tanks, a momentum device actuated by relative movement of said stabilized element relative to the hull for operating said controller, and means for modifying at the will of an operator the effectiveness of the momentum device with respect to the controller.

44. A system for controlling a marine vessel, including in combination a ship's hull having movable balancing means, a stabilizer including an element fixed in space, a controller for modifying the action of said movable balancing means, a momentum device actuated by relative movement of said stabilized element relative to the hull for operating said controller, and manually adjustable means to modify the action of said momentum device with respect to the controller.

45. A system for controlling a marine vessel, including in combination a buoyant body, means for controlling the balancing movement of said body to overcome the natural roll of the body, a normally inactive controller adapted to control said balancing means, a gyroscope positioned on said body, means actuated by relative movement of the gyroscope with respect to the body for rendering said controller active, and a manually operable device for changing the effectiveness of said last named means with respect to said controller.

46. A system for controlling a marine vessel, including in combination a buoyant body, means for controlling the balancing movement of said body to overcome the natural roll of the body, a normally inactive controller adapted to control said balancing means, a gyroscope positioned on said body, a momentum device variably operative according to the speed of roll of the body, and means operated by the conjoint action of said gyroscope and said momentum device for controlling the relative periods at which said controller becomes effective, and means adjustable at the will of an operator for changing the periods of effectiveness.

47. A system for controlling a marine vessel, including in combination a buoyant body, means thereon for controlling a mass of material for balancing the body, locking means for causing said first mentioned means to retain the balancing material, stabilizing means for unlocking the second named means, and manual means for modifying the effectiveness of the stabilizing means.

48. A system for controlling a marine vessel, including in combination a buoyant body, means thereon for retaining and discharging a mass of material for balancing the body, locking means for causing said first mentioned means to retain the balancing material, an arm for controlling the action of the last named means, a rotatable shaft, a momentum element slidably mounted on the shaft and acted upon by centrifugal force to restore the momentum element to normal, a gyroscopic rotor stabilized in space with respect to a given axis, power means actuated by and in proportion to movement of the buoyant body with respect to the gyroscopic rotor for driving said shaft, means controlled by said arm for actuating the locking means, and a manual controller for changing the effectiveness of said last named means.

49. In a system for controlling marine vessels, a buoyant body, a speed indicating device, means controlled by rolling movement of the body for actuating said device to indicate the speed of roll of the body, means controlled by said speed indicating device for balancing the body with respect to a given fixed plane, and a manually operable device for modifying the action of said last named means.

50. In a system for controlling marine vessels, a buoyant body, a speed indicating device, means controlled by rolling movement of the body for actuating said device to indicate the speed of roll of the body, a gyroscope stabilized with respect to a fixed plane, means controlled by the conjoint action of said gyroscope and said speed indicating device for balancing the body with respect to said plane, and a manually operable device for modifying the action of said last named means.

51. A system for controlling a buoyant body, including in combination fluid containers positioned on said body at spaced points to control balancing fluid, a plurality of conducting pipes interconnecting said containers, valves controlling said pipes respectively, a speed indicating device actuated proportionally to the speed of lateral roll of the body, a stabilizing device stabilized with respect to a given fixed plane, means controlled by the conjoint action of the speed indicating device and the stabilizing device to actuate said valves at relatively different times, and a manually operable device for modifying the action of said last named means.

52. The combination with a buoyant body, of means thereon for containing a mass of movable material, means for conducting said material about said body, a gyroscope having an element stabilized with respect to a fixed predetermined plane, a momentum device variably acted upon by relative movement of the buoyant body with respect to said gyroscope element, means controlled by the conjoint action of said gyroscope and said momentum device for controlling said conducting means, and a manual device to modify the action of said last named means.

53. In a stabilizing system for vessels adapted to float in a natural medium, containers for said medium positioned on opposite portions of the vessel, normally ineffective means for transmitting medium from one container to a different container for counter balancing the roll of the vessel, a plurality of groups of actuating devices for said transmitting means, a gyroscope stabilizer for controlling said actuating means, and a plurality of manually adjustable devices for modifying the effectiveness of the gyroscope with respect to the groups of actuating devices respectively.

54. In a stabilizing system for vessels adapted to float in a natural medium, containers for said medium positioned on opposite portions of the vessel, means for transmitting medium from one container to a different container for counter balancing the roll of the vessel, a plurality of groups of actuating devices for rendering said transmitting means effective, a gyroscopic stabilizer positioned between said containers for controlling said actuating devices, and a plurality of manual devices for modifying the action of said actuating devices respectively.

55. In a stabilizing system for vessels adapted to float in a natural medium, containers for said medium positioned on opposite sides of the vessel, means for transmitting medium from one container to a different container, means for rendering said transmitting medium effective in one direction, means for rendering said transmitting means effective in a different direction, a gyroscopic stabilizer positioned substantially on the longitudinal axis of the vessel for controlling said actuating means, a manual device for modifying the effectiveness of the stabilizer with respect to the first named actuating means, and a second manual device for modifying the effectiveness of the stabilizer with respect to the second actuating means.

56. In a ship control system, the combination with a ship having tanks arranged along the sides thereof and open to the sea, of conducting pipes for fluid interconnecting said tanks in pairs, a valve for closing each of said pipes, a group of electro magnet solenoids for controlling said valves in one direction, a second group of electro magnet solenoids for controlling said valves in a different direction, an element stabilized with respect to the horizontal, an arm pivotally mounted on the ship, a yielding element for normally maintaining said arm in a predetermined position, power transmitting means interconnecting said stabilizing element and said arm for moving the arm to an extent proportional to the speed of roll of the ship with respect to the horizontal, a plurality of contact devices selectively engaged by one end of the arm for controlling the circuits of the first group of electro magnet solenoids, a second plurality of contact devices selectively engaged by the other end of said arm for controlling the circuits of the second named group of electro magnet solenoids, a manually adjustable device for changing the adjustment of the first named group of contact devices with respect to the arm, and a second manually adjustable device for changing the adjustment of the second named group of contact devices with respect to said arm.

57. In a ship control system, the combination with a ship having tanks arranged along the sides thereof and open to the sea, of conducting pipes for fluid interconnecting said tanks in pairs, a valve for closing each of said pipes, a group of electro magnet solenoids for controlling said valves in one direction, a second group of electro magnet solenoids for controlling said valves in a different direction, an element stabilized with respect to the horizontal, an arm pivotally mounted on the ship, a yielding element for normally maintaining said arm in a predetermined position, power transmitting means interconnecting said stabilizing element and said arm for moving the arm to an extent proportional to the speed of roll of the ship with respect to the horizontal, a plurality of contact devices selectively engaged by one end of the arm for controlling the circuits of the first group of electro magnet solenoids, a second plurality of contact devices selectively engaged by the other end of said arm for controlling the circuits of the second named group of electro magnet solenoids, a manually adjustable device for changing the adjustment of the first named group of contact devices with respect to the arm, and an indicator for each of said manually adjustable devices for indicating the adjustments thereof.

58. In a ship stabilizing system, a plurality of tanks adapted to contain a stabilizing fluid, a control fluid for governing the amount of stabilizing fluid present in the respective tanks, and means operable in accordance with the angular position of the ship for regulating the flow of said control fluid.

Signed at New York in the county of New York and State of New York this sixteenth day of July, A. D. 1926.

JOHN HAYS HAMMOND, Jr.